United States Patent [19]
Mellen

[11] 3,744,573
[45] July 10, 1973

[54] ROLL OVER PLOW
[75] Inventor: William F. Mellen, Fullerton, Calif.
[73] Assignee: Alice Marian Mellen, Anaheim, Calif.
[22] Filed: July 2, 1971
[21] Appl. No.: 159,116

[52] U.S. Cl. .................................. 172/225, 172/666
[51] Int. Cl. .............................................. A01b 3/28
[58] Field of Search ............ 172/161, 204, 209–210, 172/212, 501, 223–227, 666, 232

[56] References Cited
UNITED STATES PATENTS

| | | | |
|---|---|---|---|
| 3,517,749 | 6/1970 | Callahan | 172/225 |
| 3,524,509 | 8/1970 | Richey | 172/223 |
| 3,175,624 | 3/1965 | Ward | 172/225 |
| 3,386,518 | 6/1968 | Mellen | 172/225 |
| 3,428,135 | 2/1969 | Richey | 172/225 |
| 3,503,451 | 3/1970 | Eastman | 172/225 |
| 3,554,294 | 1/1971 | Morkoski et al. | 172/223 |
| 3,583,493 | 6/1971 | Wadelton | 172/225 |

Primary Examiner—Robert E. Pulfrey
Assistant Examiner—Paul T. Sewell
Attorney—William C. Babcock

[57] ABSTRACT

This invention is relative to two way roll over plows, with particular reference to mechanisms for rolling the plow assembly from one operating position to another. It is characterized by having a hydraulic actuator for rotating the plow assembly, but wherein lost motion means is provided for insuring that the hydraulic actuator is able to turn the assembly over center each and every time. Such lost motion means causes a slotted member, which cooperates with a pin as well as a bracket, to make the hydraulic actuator operate behind the center of weight of the plow assembly. This invention also relates to mounting means for a hydraulic actuator to ensure that it is fully extended and retracted when used to rotate the plow assembly. Also locking means is provided for locking the plow assembly in its operating positions.

6 Claims, 13 Drawing Figures

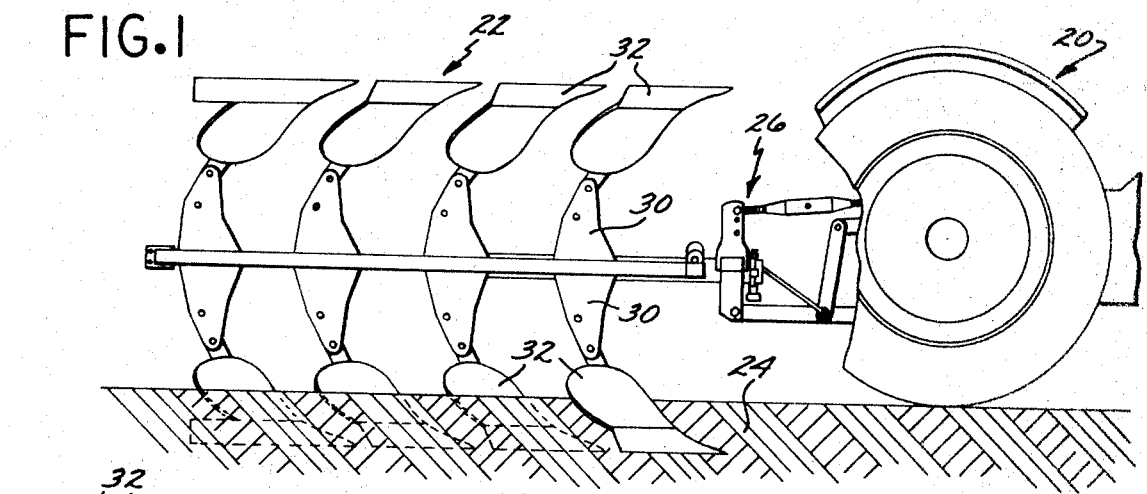
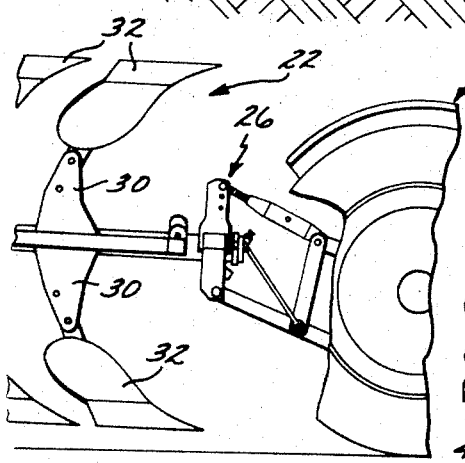
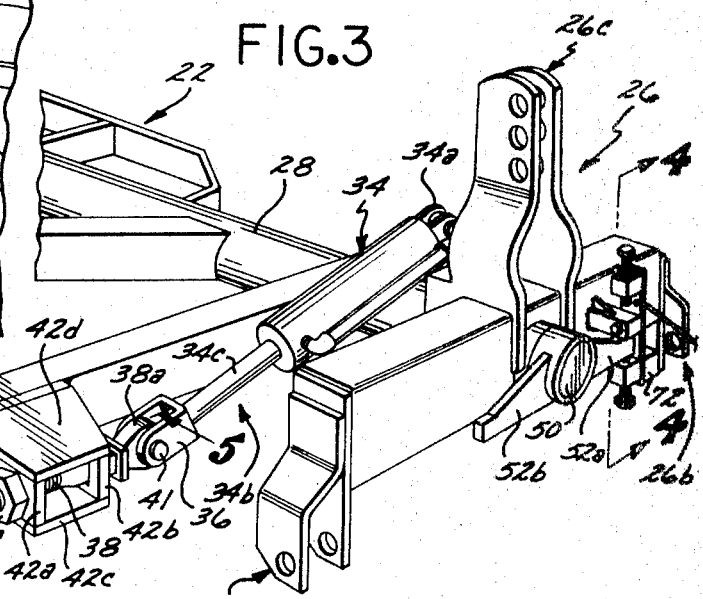
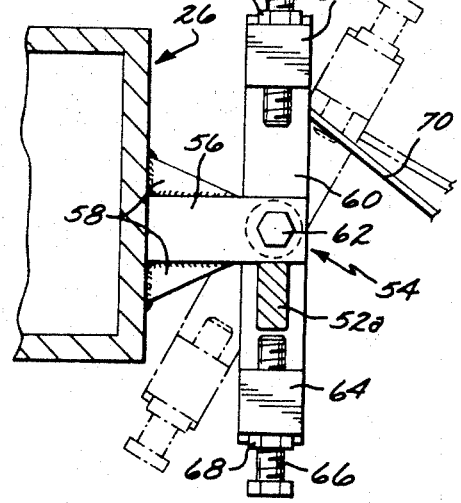
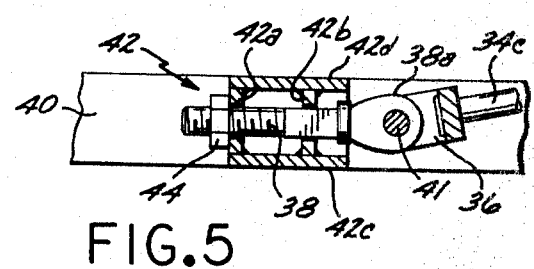

PATENTED JUL 10 1973
3,744,573
SHEET 2 OF 2
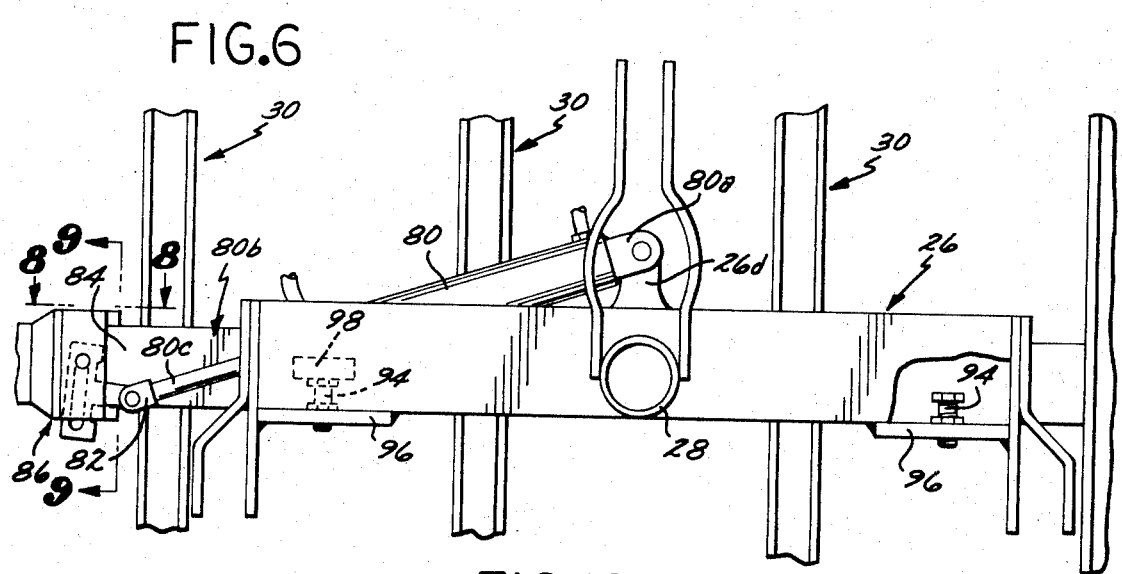
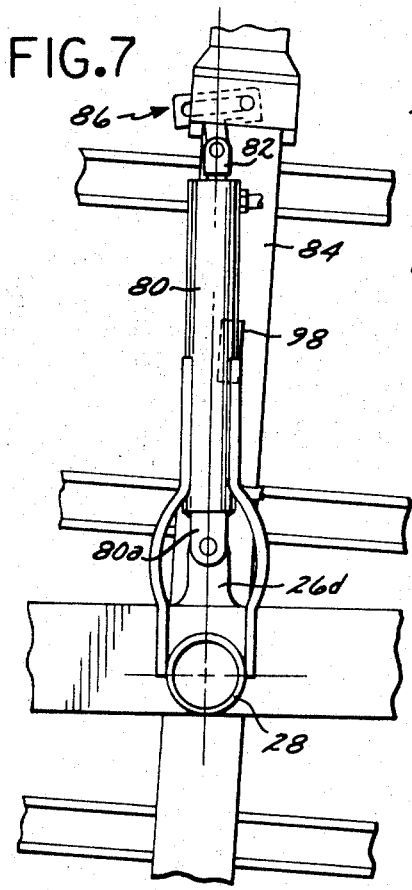
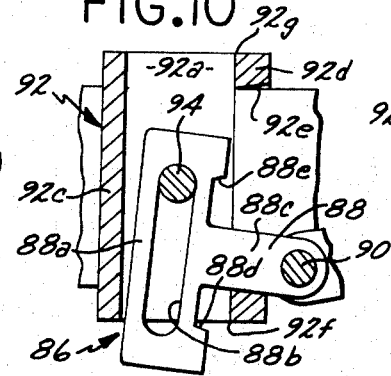
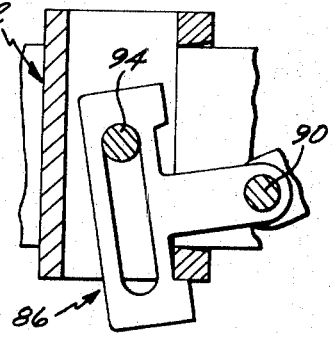
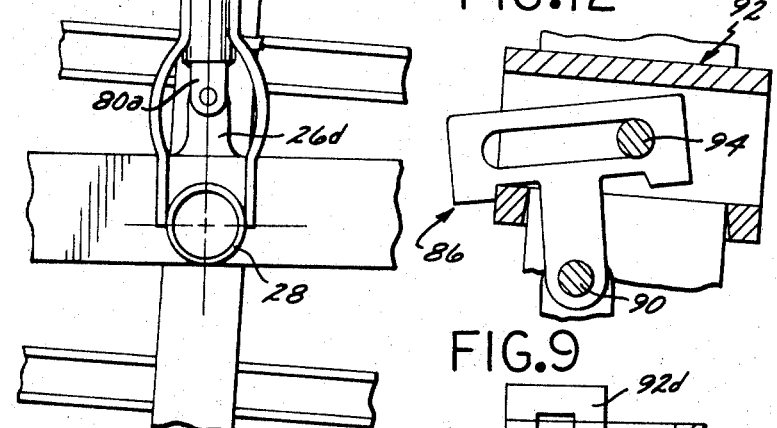
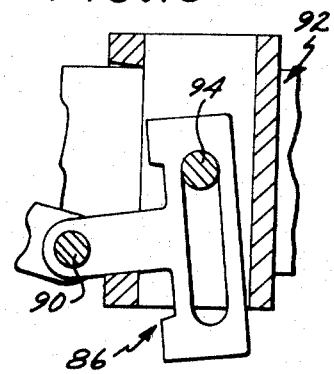
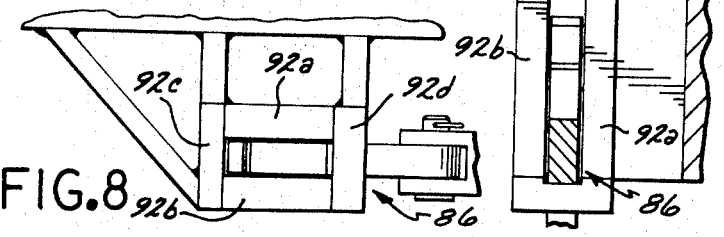
INVENTOR.
WILLIAM F. MELLEN
BY
Nienow & Frater
ATTORNEYS

ROLL OVER PLOW

The present invention relates generally to two-way roll over plows, and more particularly, to roll over mechanisms which employ a single hydraulic actuator.

As is well understood in the art, two-way roll over plows have become extremely popular in working the soil or ground for planting, because they enable the operator to work in a single direction along the length of the field. That is, unless the plow is of the two-way type, it is necessary for the operator to start in the center of the field and to alternate passes on either side of the center of the field so that the proceeding furrows are filled in by succeeding passes. This results in a considerable waste of time in traveling along the ends of the field, particularly as the worked area is increased.

With the use of a two-way plow, the operator is able to begin at one end of the field and to work steadily and successively toward the other end merely by turning over the plow at each end of the field to reverse the position of the mold boards or plow bottoms as well as the direction in which the ground is turned over.

For a considerable period of time it has been the desire to provide a simple and effective roll over mechanism which employs a minimum number of parts for efficient operation.

To this end, roll over mechanisms which employ a single hydraulic actuator have been provided, but not without considerable difficulty. That is, single actuator roll over mechanisms heretofore employed have had difficulty in insuring that the center of weight of the plow assembly is moved beyond the center of rotation so that gravity will take over and continue the movement of the assembly from one operating position to another.

In view of these shortcomings, it is an object of the present invention to provide a roll over mechanism for two-way plows which effects movement of the plow assembly beyond dead center.

Another object of the present invention is to provide a roll over mechanism and two-way plow structure as characterized above wherein the roll over mechanism is automatically reversed on each movement so as to be in condition to return the plow assembly to its original position while insuring that it will not hang up on dead center.

A further object of this invention is to provide a roll over mechanism and plow structure as characterized above which employs lost motion means which automatically reverses itself on succeeding alternative movements of the plow assembly.

A still further object of the present invention is to provide a plow structure as characterized above which is simple and inexpensive to manufacture and which is rugged and dependable in operation.

Another object of the present invention is to provide a locking device for use on a two-way roll over plow for locking the plow assembly in either of its two operating positions.

A still further object of the present invention is to provide a locking device as characterized above which is operable substantially automatically upon lifting of the plow assembly to unlock such device to permit the plow assembly to be rotated.

A even further object of the present invention is to provide a locking device and adjustment means therefor which are simple and inexpensive to manufacture and which are rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIG. 1 is a fragmentary side elevation view of a tractor and two-way plow assembly attached thereto;

FIG. 2 is a fragmentary sid elevation view of a portion of FIG. 1;

FIG. 3 is a fragmentary perspective view of the frame and plow assembly of FIG. 1;

FIG. 4 is a fragmentary sectional view, taken substantially along line 4—4 of FIG. 3;

FIG. 5 is a fragmentary sectional view taken substantially along line 5—5 of FIG. 3;

FIG. 6 is a fragmentary elevational view of a roll over mechanism having lost motion means;

FIG. 7 is a fragmentary elevational view showing the roll over mechanism of FIG. 6 in an intermediate position.

FIG. 8 is a fragmentary top view taken substantially along line 8-8 of FIG. 6;

FIG. 9 is a fragmentary sectional view taken substantially along line 9—9 of FIG. 6;

FIG. 10 is a sectional view illustrating the first position the slotted member occupies when the pad is resting on the stop bolt as shown in FIG. 6, and the actuator and piston rod are fully extended to maintain the plow assembly in a plowing position;

FIG. 11 is a sectional view illustrating a second position to which the slotted member pivots as the piston rod starts to retract into the actuator to pivot the plow assembly from one plowing position to the other thereof;

FIG. 12 is a sectional view still illustrating the slotted member in the second position but after the slotted member and actuator have cooperated to pivot the plow assembly through dead center; and FIG. 13 is a sectional view illustrating a third position to which the slotted member is pivoted by full extension of the piston rod after the plow assembly has been pivoted to a plowing position and the pad rests on the right hand stop nut illustrated in FIG. 6.

Like reference characters indicate corresponding parts throughout the several views of the drawings.

Referring to FIG. 1 of the drawings there is shown therein motive power means 20 such as a gasoline engine operated tractor for pulling a plow mechanism or assembly 22 through the ground or soil 24.

Interconnecting the tractor 20 and the plow assembly 22 is a typical three point hitch comprising a frame 26, best shown in FIG. 3 of the drawings, having connection points 26a, 26b and 26c which recieve appropriate connecting links from the tractor.

The three point hitch 26 is of such construction and is so connected to the tractor 20, that when the entire hitch is elevated or lifted, the frame 26 remains in its vertical position or orientation. Such lifting force is normally provided by suitable hudraulic means associated with and operated from the tractor 20. Such lifting operation is shown most clearly in FIG. 2 of the drawings wherein the frame 26 remains substantially vertical.

Plow assembly 22 comprises a substantially horizontal mounting shaft 28 to which is secured suitable mounting arms or brackets 30 which carry appropriate plow bottoms or mold boards 32. Such plow bottoms are made to turn over the soil as the bottoms are pulled horizontally through the soil, and the upper set of plow bottoms, as shown in FIG. 1, are of reverse shape or contour from the lower set as shown therein.

Horizontal shaft 28 is rotatably mounted on frame 26 to be carried thereby and to be rotated with respect thereto. Suitable bearing means for firmly and rotatably securing shaft 28 to frame 26 should be employed and are well within the current state of the art.

For effectuating rotation of plow assembly 22, there is provided a hydraulic actuator 34. One end 34a of actuator 34 is secured relative to frame 26 above the axis of rotation of shaft 28. That is, 34a of actuator 34 is mounted on a vertical axis which intersects to axis of rotation of shaft 28 but is spaced upwardly from the latter.

The opposite end 34b of actuator 34 comprises a piston rod 34c to which is fastened a clevis 36. A threaded shaft 38 having an enlarged end portion 38a which is formed with a through opening for receiving a pin 41 is provided as shown in FIG. 3 of the drawings. Such pin 41 extends through suitable openings in clevis 36 and the enlarged end portion to afford pivotal connection between shaft 38 and and actuator 34.

An extension or arm 40 secured to shaft 28 as by welding, brazing, soldering or the like, is provided for turning the plow assembly 22 from one operating position to another. Mounted on extension 40 is a box-shaped bracket 42 having a pair of spaced end walls 42a and 42b, each of which is secured to opposite side walls 42c and 42d. Such box bracket is formed by having such walls firmly welded together and the end walls 42a and 42b are provided with aligned openings, the one in end wall 42b being substantially square for receiving a correspondingly formed portion on shaft 38.

When it is desired to turn over the plow assembly 22 from one operating position to another, as for instance upon reaching the end of a plowed section, it is merely necessary to manipulate suitable controls (not shown) on the tractor 20 to activate actuator 34. The latter device is operated by hydraulic fluid and comprises a piston mounted within a cylinder, said piston being secured to piston rod 34c.

Actuation of hydraulic actuator 34 while in its position of FIG. 3 retracts piston rod 34c. Due to the fact that end portion 34a is mounted above the center of rotation of shaft 28, retracting piston rod 34c causes extension 40 and plow assembly 22 to be rotated substantially clockwise as shown in FIG. 3.

When the assembly reaches its top most position wherein the actuator 34 is in its shortest condition, it is desirable to have the piston and rod 34c of the actuator fully retracted to remove extraneous forces from various components of the plow.

Thereafter, the hydraulic actuator 34, is extended so as to continue the rotation of the plow assembly 22 toward its other operating position. Again, it becomes desirable to insure that the hydraulic actuator 34 is fully extended to enable the assembly to remain in its desired operating position without hydraulic forces and pressure being applied to the mechanism.

To enable such full extension and retraction of actuator 34, the effective length of such hydraulic linkage can be varied by merely changing the position of fastening nut 44 on threaded shaft 38. Thus, the operator can insure that the adjustable mounting means 42 is loose and ineffective whenever the plow assembly 22 is in either of its operating positions.

Fixed to one end of shaft 28 is a collar 50 for rotation therewith. Collar 50 may constitute a bearing member for retaining the shaft in proper position relative to frame 26, but in any event, carries a pair of limit stop arms 52a and 52b. As will be readily apparent to those persons skilled in the art, arms 52a and 52b rotate with shaft 28 and plow assembly 22. Such arms are employed to firmly lock the plow assembly in either of its two aforesaid operating positions.

As shown particularly in FIGS. 3 and 4 of the drawings, the mechanism employed for such locking operation is locking device 54.

Formed as part of locking device 54 is a limit stop 56 which is firmly secured to frame 26 as by welding, brazing, soldering or the like. Due to the forces encountered by such limit stop suitable gussets or braces 58 may be employed as desired.

Such limit stop, as shown most clearly in FIG. 3, is provided with a generally square cross section and extends into the rotational path of arms 52a and 52b. As such, whenever plow assembly 22 is rotated, one or the other of such arms is caused to engage limit stop 56 to thereby define the approximate operating position of the plow assembly.

To lock the plow assembly in such operating position, there is provided the locking device 54. Such device comprises an arm or plate 60 which is pivotally mounted on limit stop 56 be a suitable pin or bolt 62; such pivotal mounting being substantially intermediate to the ends of plate 60.

Secured to opposite ends of plate 60 as by welding, brazing, soldering or the like, are blocks 64, each of which carries an adjustment bolt 66 and an appropriate locking nut 68.

As shown in FIGS. 3 and 4, with the arm 52a on the under side of limit stop 56 and with the lower most adjustment bolt 66 in close proximity thereto, such arm 52a and hence plow assembly 22 are retained or locked in the corresponding operating position.

In like fashion, following rotation of the plow assembly 22, as above described, so as to cause arm 52b to engage the upper surface of limit stop 56, the plow assembly is retained or locked in such position whenever the bolt 66 is positioned over the arm 52b.

The adjustment bolts 66 are operable to permit of adjustment of the final operating position of the plow bottoms within the soil because as the plow bottoms engage the soil a back pressure is developed which tends to push upwardly on the entire plow assembly. This causes the appropriate one of the arms 52a and 52b to bottom against the corresponding adjustment bolt 66.

To release the plow assembly 22 to permit it to be rotated to its other operating position, it is merely necessary to pivot plate 60 on limit stop 56 as shown most clearly in FIG. 4. To accomplish this substantially automatically, a cord, chain or other appropriate link 70 is connected between the upper portion of plate 60 and a point on tractor 20 as shown most clearly in FIGS. 1, 2, 3 and 4 of the drawings. Thus, whenever the plow assembly is lifted, as for instance when the end of a furrow is reached, the link 70 automatically rotates the locking device 54 into the dotted line position shown in FIG. 4. This enables one of the limit stop arms to be disengaged from the locking device and the other arm to be moved into a position of engagement therewith. Such movement, of course, takes place upon rotation of the plow assembly 22 as hereinbefore described.

As shown most clearly in FIG. 3 of the drawings, a weight 72 is secured to plate 60 to return the latter to a vertical position whenever the plow assembly is lowered into the ground. This causes the locking device 54 to return to its locked position for engagement with the appropriate one of the limit stop arms.

Shown in FIGS. 6 - 13 inclusive is a roll over mechanism for insuring that the plow assembly will not be positioned on dead center.

Referring to FIG. 6, there is shown therein a frame 26 which is identical with the frame 26 of FIG. 3. The mounting means 30 for securing the mold boards or plow bottoms 32 relative to shaft 28 are also shown in FIG. 6.

To effectively turn the plow assembly from one position to another, there is provided a hydraulic actuator or cylinder 80. One end 80a of actuator 80 is pivotally secured to an extension 26d of frame 26. Such extension causes end 80a of actuator 80 to be mounted along a vertical axis which intersects the axis of rotation of shaft 28. Also, as will be readily apparent to those persons skilled in the art, it is essential that the pivot mounting 80a be above the axis of rotation of said shaft 28.

The opposite end 80b of actuator 80 comprises a piston rod 80c which is secured to clevis 82. An extension or arm 84 is provided on shaft 28 as shown in FIG. 6, and lost motion means 86 is provided between said extension and clevis 82.

Referring more particularly to FIG. 10 of drawings, the lost motion means 86 is shown therein in detail. It comprises a slotted member 88 which is generally T-shaped and has one end pivotally secured to clevis 82 by a pin 90. Slotted member 88 is provided with a crops arm 88a wherein is formed a slot 88b which extends substantially transversely of the arm 88c which is pivotally secured to clevis 82. As shown most particularly in FIGS. 8 and 9, slotted member 88 is relatively flat and fits within a bracket 92 which is firmly secured to extension 84 as by welding, brazing, soldering and the like. Said bracket has a box section affording two opposite side walls 92a and 92b, one solid end wall 92c and a open end wall 92d. The opening 92e in end wall 92d enables the arm 88e of slotted member 88 to extend therethrough. A pivot pin 94 extends through suitable openings formed in opposite side walls 92a and 92b and secured therein and therebetween by any appropriate means such as brazing, welding, soldering and the like. Such pin 94, as shown in the drawings, extends through the slot 88b of member 88.

Suitable interlocking means is provided between member 88 and bracket 92. Such interlocking means takes the form of a pair of offsets 88d and 88e as well as the corners or edges 92f and 92g on end wall 92d.

The offsets 88d and 88e are so positioned and are so formed as to size and shape as to engage the corners 92f and 92g, respectively, when the member 88 is in its opposite positions with respect to the pin 94. Such engagement is most clearly shown in FIGS. 11 and 12.

In rotating a two-way turn over plow from one position to another, it is desirable to insure that the plow assembly does not remain on or get hung up on dead center. That is, in order to enable the mechanism to be operated reversely, (first counterclockwise and then clockwise) it is necessary for the pin 94 to be substantially along the center of weight of the plow assembly.

The present invention provides means for repositioning the axis of operation of the reciprocable actuator 80 behind the center of weight defined by pin 94 whenever the plow assembly is approaching the mid-position. This is accomplished by virtue of gravity causing slotted member 88 to fall downwardly so that it is positioned with respect to pin 94 as shown in FIG. 10, while the plow assembly is in one of its positions. Then, when it is desired to rotate the plow assembly to its other position, retraction of actuator 80 causes offset 88d to engage corner 92f as shown in FIG. 11. Now, the axis of operation of hydraulic actuator 80 is below pin 94.

Such actuator is then operated such as to retract the piston rod 88c until the mid-point is reached as shown in FIG. 7. It will be noted that the actuator 80 is now along a vertical center line or axis through the axis of rotation of shaft 28, but the pin 94 and hence, center of weight of plow assembly 22 is already beyond such center line.

Thereafter, removal of the retracting fluid pressure on actuator 80 permits the plow assembly to fall to its other operating position under the force of gravity.

As shown in FIG. 13, when such other operating position is reached, the slotted member 88 falls under the force of gravity so that the pin 94 is at the other end of slot 88b. Thus, the lost motion means has been prepared for the returned rotational movement of the plow assembly to its original operating position, with the offset 88e poised to engage corner 92g at the appropriate time. Such return rotation, of course, will again have the axis of operation of actuator 88 behind the center of weight as defined by pin 94 throughout the initial phase of return rotation of the plow assembly.

It has also been found that once the plow assembly reaches either of its several operating positions, further extensive forces on the actuator 80 causes the slotted member 88 to be forced against the end wall 92c of bracket 92. This urges the plow assembly into such operating position and hence, the corresponding plow bottoms into the ground.

Any appropriate limit stop means may be employed as for instance, the adjustable limit stop bolts 94 as shown in FIG. 6 mounted on suitable brackets 96. For cooperation with such limit stop bolts 94, there is a pad 98 secured to extension 80.

It is thus seen that the present invention provides improved operating means for a two-way roll over plow.

While a specific embodiment of the invention has been illustrated and described in the foregoing specification, it should be understood that the invention is not limited to the exact construction shown. On the contrary, various modifications and alterations in the construction, and arrangement of parts, as well as numerous equivalents, will be apparent to those skilled in the art without departing from the scope and spirit of the invention.

I claim:

1. A two-way roll over plow of the type that includes an elongate frame that extends rearwardly from motive power means, a plow assembly rotatably mounted on said frame for rotating between first and second positions, a hydraulic fluid-operated actuator that has a first elongate portion and a second elongate portion that may be extended and retracted relative to said first portion, said actuator transversely disposed relative to said frame, with said first portion being pivotal on a fixed axis that is in alignment with a vertical plane that extends longitudinally through said frame, first and second stop means that prevent said plow assembly pivoting below said first and second plowing positions, and said plow being characterized by:

a. a bracket secured to said plow assembly outwardly from said frame, said bracket defining an interior space transversely aligned with said actuator;

b. a pin having a longitudinal axis parallel to said elongate frame, said pin supported from said bracket and spanning said interior space; and c. a member at least partially disposed in said interior space and pivotally connected to said second portion, said member having a slot therein that slidably engages said pin to cooperate therewith to provide lost motion means, with said member and bracket of such shape that when retraction of said actuator is initiated, when said plow assembly is in either a first or second of said operating positions, said member pivots on said pin to interlock with said bracket and so remains until said plow assembly has pivoted to the other of said operating positions, with said member and bracket when in said interlocking position moving the center of weight of said plow assembly past said vertical plane towards the other of said operating positions prior to the longitudinal axis of said actuator being aligned with said vertical plane, and continued extension of said second portion after said plow assembly has pivoted to either said first or second operating positions, resulting in said member moving from said interlocking position to a second position where a portion thereof so bears on a portion of said bracket that said plow assembly is held at a fixed position relative to either said first or second stop means and in contact therewith.

2. A plow as defined in claim 1 in which said slot has first and second ends and said member has first and second spaced engaging means thereon that can each interlock with said bracket, with said pin being in contact with said first end of said slot and said first engaging means interlocking with said bracket when said member and bracket interlock as said actuator is retracted to pivot said plow assembly from said first towards said second position, and said pin being in contact with said second end of said slot and said second engaging means interlocking with said bracket when said member and bracket interlock as said actuator is retracted to pivot said plow assembly from said second towards said first position.

3. A plow as defined in claim 2 in which said first and second engaging means are first and second spaced offsets defined on said member.

4. A plow as defined in claim 3 in which said member is of T shape and includes first and second normally disposed arms, with said first arm having first and second ends that define said first and second offsets, said first arm having said slot longitudinally positioned therein, and said second arm having a first free end that is pivotally connected to said second portion.

5. A plow as defined in claim 4 in which said bracket includes an end wall that has an elongate opening therein partially defined by first and second spaced surfaces of said end wall, said opening in communication with said interior space and having said second arm movably disposed therein, said member when in said second position and said plow assembly in said first operating position having said pin in contact with said first end of said slot and said second arm in pressure contact with said first surface, and said member when in said second position and said plow assembly in said second operating position having said pin in contact with said second end of said slot and said second arm in pressure contact with said second surface.

6. A two-way roll over plow of the type that includes an elongate frame that extends rearwardly from motive power means, a plow assembly rotatably mounted on said frame for rotating between first and second operating positions, a hydraulic fluid-operated actuator that has a first elongate portion and a second elongate portion that may be extended and retracted relative to said first portion, said actuator transversely disposed relative to said frame, with said first portion being pivotal on a fixed axis that is in alignment with a vertical plane that extends longitudinally through said frame, first and second stops supported from said frame that limit said plow assembly from moving below said first and second operating positions, and said plow being characterized by interlocking means that include a first pin-supporting bracket mounted on said plow assembly outwardly from said frame and a slotted member pivotally supported from said second portion that movably engages said pin, said slotted member and bracket interlocking when said actuator is retracted to pivot said plow assembly from one of said operating positions towards the other thereof, with the center of weight of the plow assembly moving past said vertical plane prior to the longitudinal axis of said actuator moving into alignment with said plane, and said slotted member when said actuator is extended with said plow assembly in either said first or second operating positions so cooperating with said pin-supporting bracket and either said first or second stops as to maintain said plow assembly in said first or second operating position.

* * * * *